(12) United States Patent
Cole et al.

(10) Patent No.: US 10,504,311 B1
(45) Date of Patent: Dec. 10, 2019

(54) CRITICAL AREA SAFETY DEVICE AND METHODS OF USE

(71) Applicant: GYM DOOR REPAIRS, INC., Great River, NY (US)

(72) Inventors: Stephen F. Cole, Great River, NY (US); Kathleen Cole, Great River, NY (US)

(73) Assignee: GYM DOOR REPAIRS, INC., Great River, NY (US)

( * ) Notice: Subject to any disclaimer, the term of this patent is extended or adjusted under 35 U.S.C. 154(b) by 0 days.

(21) Appl. No.: 16/155,303

(22) Filed: Oct. 9, 2018

Related U.S. Application Data

(60) Provisional application No. 62/724,844, filed on Aug. 30, 2018.

(51) Int. Cl.
*G07C 9/00* (2006.01)
*G06F 21/32* (2013.01)
*G06F 16/22* (2019.01)

(52) U.S. Cl.
CPC ......... *G07C 9/00158* (2013.01); *G06F 16/22* (2019.01); *G06F 21/32* (2013.01)

(58) Field of Classification Search
CPC .................. G07C 9/00158; G06F 17/30312
USPC ........................................................ 340/5.52
See application file for complete search history.

(56) References Cited

U.S. PATENT DOCUMENTS

| | | | | |
|---|---|---|---|---|
| 7,228,664 | B2 * | 6/2007 | Clark | E04B 2/827 52/243.1 |
| 2004/0069420 | A1 * | 4/2004 | Petriello | E04B 2/827 160/199 |
| 2004/0146186 | A1 * | 7/2004 | Gelbord | G06K 9/00067 382/115 |
| 2006/0113380 | A1 * | 6/2006 | Schneider | G07C 9/00158 235/380 |
| 2010/0060413 | A1 * | 3/2010 | Fitzgibbon | B60R 25/00 340/5.53 |

* cited by examiner

*Primary Examiner* — Vernal U Brown
(74) *Attorney, Agent, or Firm* — Sorell, Lenna & Schmidt, LLP

(57) ABSTRACT

A method for maintaining a folding operable wall comprising: (a) recording a template of a biological trait of an authorized individual into a biometric verification system; (b) saving the template in a database; (c) capturing a new record; (d) comparing the new record against the template; (e) confirming the identity of the authorized individual if the new record is substantially similar to the saved template; (f) preventing the electrical operation circuit from functioning if the biometric verification system fails to authenticate the identity of the authorized individual; and (g) restarting the electrical operation circuit after the identity of the authorized individual is verified.

20 Claims, 8 Drawing Sheets

CRITICAL AREA SAFETY DEVICE AND METHODS OF USE

TECHNICAL FIELD

The present disclosure generally relates to electrically operated folding partitions, and more particularly to systems and methods for preventing injury to persons located in a critical areas of electrically operated folding partitions.

BACKGROUND

Folding partitions or walls having a plurality of vertically oriented panels have conventionally been used to provide temporary walls to, for example, divide off two or more areas of a given room. In particular, folding portable partitions provide a quick and efficient means to divide large open rooms, such as a school gymnasium or auditorium, into smaller areas. The vertically oriented panels are suspended from a horizontal rail system along which the panels are movable. In order to facilitate movement of the portable folding partitions, casters or wheels may be used, which allow the portable partition to be easily positioned to the desired location, and then rolled back into its storage area for later use.

Folding partitions have been adapted to include mechanisms which open and close the moving partitions automatically by an electrical system. Due to the large amount of force needed to move the weight of the folding partitions, electrically operated folding partitions can cause injury, or even death, to a person who accidentally becomes trapped between the partitions.

In order to make electrically operated folding partitions safer, the electrical systems have been adapted to install a safety device that will (a) stop the forward motion of an electrically operated folding partition whenever a person approaches the moving partition and the wall, and (b) stop the partition when a person is present in an area where the partition is being stacked. One such example of this type of electrically operated folding partition is described in U.S. Pat. No. 5,244,030 to Cole et al., the contents of which are incorporated herein by reference. In particular, the electrically operated folding partition described in U.S. Pat. No. 5,244,030 to Cole et al. includes a mechanism for shutting down the electrical operation circuit of the folding operable walls when a physical obstruction interrupts an infrared barrier curtain on opposite sides of an operating path of the folding operable walls. Although this device provides protection when someone approaches the operating doors, it does not provide complete coverage for certain danger areas, especially in a critical area directly between the leading edges of the doors themselves. Nor does it prevent an unauthorized user from operating the folding operable wall.

Thus, even with electrically operated folding partitions containing automatic reversal sensors or automatic shut-off sensors there is danger that an undetected individual will become trapped between the folding partitions. Therefore, it would be desirable to provide a system and method for protecting the critical area of folding operable walls.

Dangers associated with electrically operated folding partitions increase when an operator of an electrically operated folding partition is not sufficiently trained or otherwise capable of operating the electrically operated folding partition in a safe manner. Accordingly, it is beneficial to ensure that only authorized users operate the electrically operated folding partition. Some conventional electrically operated folding partitions may require a key to fold or unfold the partition. However, such keys are easily lost and may fall into the hands of an unauthorized user. Conventional electrically operated folding partitions lack other means to prevent unauthorized users from operating the electrically operated folding partitions, thus making any included safety features, such as, for example, a key easy to circumvent. This disclosure describes an improvement over these prior art technologies.

SUMMARY

Accordingly, the present disclosure provides a method for maintaining a folding operable wall. The method includes: (a) providing an electrically operated folding operable wall controlled by an electrical operation circuit and having at least one biometric verification system; (b) recording a template of a biological trait of an authorized individual into the biometric verification system; (c) saving the template in a database associated with the biometric verification system; (d) capturing a new record of a biological trait of a person desiring to maintain the folding operable wall; (e) comparing the new record against the template; (f) authenticating the identity of the person desiring to maintain the folding operable wall if the new record is substantially similar to the saved template; (g) preventing the electrical operation circuit from functioning if the biometric verification system fails to authenticate the identity of the person desiring to maintain the folding operable wall; and (h) restarting the electrical operation circuit after the identity of the person desiring to maintain the folding operable wall is authenticated.

In one embodiment, the method includes: a) providing an electrically operated folding operable wall controlled by an electrical operation circuit of the type having at least one control station, an extend control switch, a stack control switch, control relays and a motor; b) recording a template of at least one designated biological trait of an individual trained and authorized to maintain the folding operable wall into a biometric verification system coupled to the at least one control station; c) saving the template of the at least one designated biological trait of an individual trained and authorized to maintain the folding operable wall in a database within the biometric verification system; d) capturing from an individual desiring to maintain the folding operable wall a new record of the designated biological trait; e) comparing the new record against the saved template using an algorithm; f) authenticating the identity of the individual desiring to maintain the folding operable wall if the new record is substantially similar to the saved template; g) preventing the electrical operation circuit of the folding operable wall from functioning if the biometric verification system fails to authenticate the identity of the individual desiring to maintain the folding operable wall, wherein the electrical operation circuit includes a preventing means having at least one control unit electrically connected between each control station of the electrical operation circuit and each biometric verification system, which will prevent the control unit from functioning if the identity of the individual desiring to maintain the folding operable wall is not authenticated; and h) restarting the electrical operation circuit of the folding operable wall after the identity of the individual desiring to maintain the folding operable wall is authenticated.

BRIEF DESCRIPTION OF THE DRAWINGS

The features of the present disclosure will become more readily apparent from the specific description accompanied by the following drawings, in which.

Like reference numerals indicate similar parts throughout the figures.

DETAILED DESCRIPTION

The following discussion includes a description of the methods of the subject invention, and related components. Alternate embodiments are also disclosed. Reference will now be made in detail to the exemplary embodiments of the present disclosure, which are illustrated in the accompanying figures. Turning now to FIGS. 1-11, the components of a system and method for authenticating the identity of individuals responsible for maintaining an electrically operated folding wall system, in accordance with the principles of the present disclosure, are illustrated.

Figure 1:
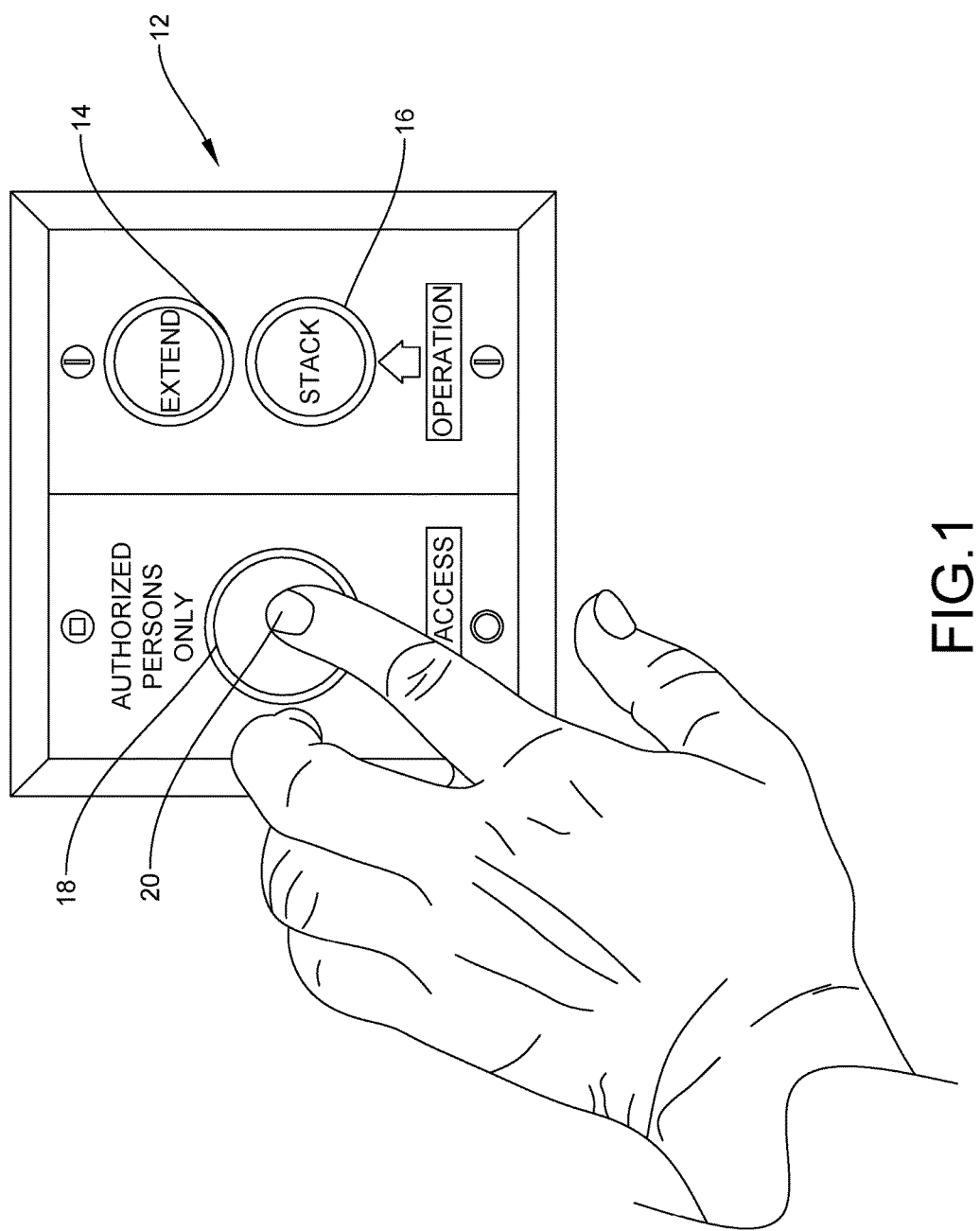
FIG. 1 is a side view of the control station of one embodiment of the electrically operated folding partition system in accordance with the principles of the present disclosure.
Figures 2, 3, 4:
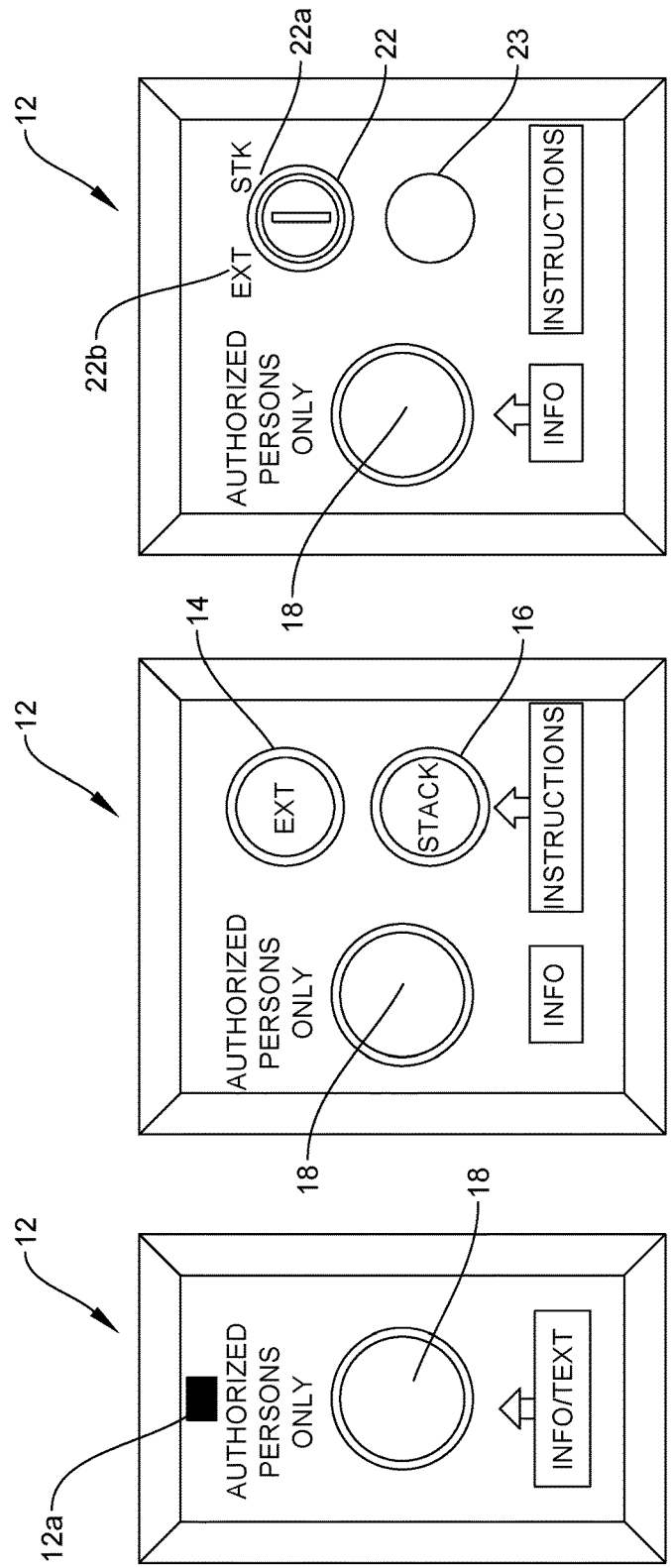
FIG. 2 is a side view of the control station of one embodiment of the electrically operated folding partition system in accordance with the principles of the present disclosure.
FIG. 3 is a side view of the control station of one embodiment of the electrically operated folding partition system in accordance with the principles of the present disclosure.
FIG. 4 is a side view of the control station of one embodiment of the electrically operated folding partition system in accordance with the principles of the present disclosure.

In one embodiment, shown in FIGS. 1 and 3, the method of the present disclosure involves an electrically operated folding operable wall controlled by an electrical operation circuit of the type having at least one control station 12, an extend control switch 14, a stack control switch 16, a biometric verification system 18, control relays and a motor. In one embodiment, shown in FIG. 2, the method of the present disclosure involves an electrically operated folding operable wall controlled by an electrical operation circuit that includes only biometric verification system 18. In another embodiment, shown in FIG. 4, the method of the present disclosure involves an electrically operated folding operable wall controlled by an electrical operation circuit where extend control switch 14 and stack control switch 16 are replaced by key switch 22 having a first position 22a and a second position 22b, which is used to stack and extend the electrically operated folding operable wall, respectively.

In a preferred embodiment, at least one control station 12 is disposed at each end of the electrically operated folding operable wall. In that the presence of at least one individual is required for each control station 12 in order to operate the electrically operated folding operable wall, by including at least one control station 12 on each side of the folding operable wall, the presence of at least two individuals is required the entire time the electrically operated folding wall is being operated. In another embodiment, the system of the present invention includes at least one control station 12 on one end of the electrically operated folding operable wall.

In the method according the present disclosure, a template of at least one biological trait of an individual trained and authorized to maintain the folding operable wall is first captured by biometric verification system 18 in an enrollment phase. Biological traits include, for example, fingerprints, facial geometry, hand geometry, earlobe geometry, retina and iris patterns, and voice waves.

Biometric verification systems suitable for use with the present invention include, for example, biometric verification systems selected from the group consisting of: fingerprint recognition systems, facial recognition systems, earlobe geometry recognition systems, hand geometry recognition systems, iris recognition systems, retina recognition systems, voice recognition systems, and combinations thereof.

In particular, the individual trained and authorized to maintain the folding operable wall will provide the required biological trait to biometric verification system 18 by, for example, placing his or her finger 20 on a fingerprint scanner in an enrollment phase, as shown in FIG. 1. The biometric verification system will create a template of the fingerprint from the scan of finger 20 obtained by the fingerprint scanner of biometric verification system 18.

The template is saved in a database or other memory device within control station 12 and/or biometric verification system 18. The template is later compared to a new record to verify the identity of the individual in a test phase, should the individual wish to access or operate the electrically operated folding operable wall. The methods of the present invention may include any biometric verification system which records a person's unique biological traits, and stores the same in a database during an enrollment phase; and then captures a new record when identification verification is subsequently required, to compare with the records in the database stored in the test phase to estimate the similarity between the new record and the stored template using an algorithm. In a preferred embodiment of the present invention, biometric verification system 18 includes a database or other memory device, which is a solid state memory.

When an individual trained and authorized to maintain the folding operable wall desires to gain access to the same, he or she must create or "capture" a new record of the same biological trait previously recorded in the enrollment phase, for example, a fingerprint. Indeed, the individual trained and authorized to maintain the folding operable wall may provide the required biological trait to biometric verification system 18 by, for example, placing his or her finger 20 on the fingerprint scanner included in biometric verification system 18, as shown in FIG. 1. The new record is compared against the template to determine if the new record and the template are substantially similar, using an algorithm. The identity of the individual trained and authorized to maintain the folding operable wall is confirmed if the new record from the test phase is substantially similar to the saved template from the enrollment phase. Once the identity is confirmed, control station 12 will allow the individual to operate the folding operable wall to extend and/or stack the wall, as discussed herein. That is, control station 12 will not allow the individual to operate the folding operable wall to extend and/or stack the wall until the individual's identity is confirmed by matching the new record with the saved template. In some embodiments, "substantially similar," as used herein refers to data and/or features that is/are at least about 50% the same, at least about 60% the same, at least about 70% the same, at least about 80% the same, at least about 90% the same, at least about 95% the same, or at least about 99% the same.

In another embodiment of the present invention, an individual trained and authorized to maintain the folding operable wall which desires to gain access to the same, may use an artificial reproduction of the biological trait previously recorded in the enrollment phase. The template is compared against the artificial reproduction of the biological trait previously recorded to determine if the artificial reproduction of the biological trait previously recorded and the template are substantially similar, using an algorithm. If the artificial reproduction of the biological trait previously recorded and the template are substantially similar, the identity of the individual whose biological trait was recorded in the enrollment phase is confirmed, thus allowing any individual possessing the artificial reproduction of the biological trait previously recorded to operate the electrically operated folding operable wall. Once the identity is confirmed, control station 12 will allow the individual to operate the folding operable wall to extend and/or stack the wall, as discussed herein. That is, control station 12 will not allow the individual to operate the folding operable wall to extend and/or stack the wall until the artificial reproduction of the biological trait previously recorded is confirmed by matching the artificial reproduction of the biological trait previously recorded with the template.

For example, artificial reproductions of fingers and/or fingerprints may be created from finger 20 of an authorized individual whose fingerprint was previously stored in a database during an enrollment phase using methods known in the art. The authorized individual may provide the artificial finger/fingerprint to an individual whose fingerprint is not recorded in the database (did not participate in the enrollment phase). The individual whose fingerprint is not recorded in the database will provide the required biological trait (a fingerprint) to biometric verification system 18 in a test phase by, for example, placing the artificial finger/fingerprint on a fingerprint scanner included in biometric verification system 18. The new record of the artificial finger/fingerprint is compared against the template to determine if the new record and the template are substantially similar, using an algorithm. The identity of the individual trained and authorized to maintain the folding operable wall is confirmed if the new record (from the test phase) is substantially similar to the saved template (from the enrollment phase). Once the identity of the individual trained and authorized to maintain the folding operable wall is confirmed using the artificial finger/fingerprint, the individual whose fingerprint is not recorded in the database (did not participate in the enrollment phase) may nevertheless access and operate the electrically operated folding partition.

Furthermore, photographic images of an individual's face, earlobe, hand, iris, and retina may be used to artificially reproduce certain characteristics of an individual's face, earlobe, hand, iris, and retina, respectively. These artificial reproductions (images) may be created to circumvent biometric verification systems 18, such as, for example, facial recognition systems, earlobe geometry recognition systems, hand geometry recognition systems, iris recognition systems, and retina recognition systems. Indeed, photographic images can circumvent facial recognition systems, earlobe geometry recognition systems, hand geometry recognition systems, iris recognition systems, and retina recognition systems to provide a trained, authorized individual responsible for maintaining the electrically operated folding partition the ability to have other trained individuals, whose biometric characteristics are not recorded in a database (did not participate in the enrollment phase), operate, and hence service, the electrically operated folding partition.

The individual trained and authorized to operate electrically operated folding operable walls, who has entered his or her biological data, such as a his or her facial geometry, earlobe geometry, hand geometry, or iris and retina patterns, for example, into the biometric verification system during the enrollment phase, may provide photographic images of his or her face, for example, to an individual whose biological data is not recorded in the database (did not participate in the enrollment phase). The individual whose biological data is not recorded in the database will provide the required biological trait (a photographic image of an individual's retina, for example) to biometric verification system 18 by, for example, placing the photograph in front of a camera included in biometric verification system 18. The new record of the photographic image is compared against the template to determine if the new record and the template are substantially similar, using an algorithm. The identity of the individual trained and authorized to maintain the folding operable wall is confirmed during the test phase if the new record is substantially similar to the saved template. Once the identity of the individual trained and authorized to maintain the folding operable wall is confirmed, the individual whose biological data is not recorded in the database (did not participate in the enrollment phase) may nevertheless access and operate the electrically operated folding partition. Indeed, any individual possessing the artificial reproduction of the biological trait previously recorded may operate the electrically operated folding operable wall.

Artificial reproductions of an individual's voice may be used to circumvent voice or speaker recognition systems. Indeed, an authorized individual, whose voice print is recorded in a database of a voice recognition system during the enrollment phase, may record his or her voice to create an artificial reproduction thereof. He or she may provide the voice recording to an individual whose voice print is not recorded in the database (did not participate in the enrollment phase), in order to allow that individual to access and operate the electrically operated folding partition. The individual will be able to access and operate the folding operable wall if the voice recording is substantially similar to the saved template.

A preventing means prevents the electrical operation circuit of the folding operable wall from functioning if biometric verification system 18 fails to authenticate the identity of an individual which is trained and authorized to operate the folding operable wall, which has had his or her biological trait(s) recorded and saved by biometric verification system 18 in an enrollment phase, from the new record. In particular, the preventing means includes at least one control unit electrically connected between each control station 12 of the electrical operation circuit and each biometric verification system 18, which will prevent control unit from functioning if the identity of an authorized individual cannot be verified.

Moreover, because the preventing means includes at least one control unit electrically connected between each control station 12 of the electrical operation circuit and each biometric verification system 18, if biometric verification system 18 fails to authenticate the identity of the individual responsible for maintaining the electrically operated folding operable wall at any time in which the electrically operated folding operable wall is in operation, the electrically operated folding operable wall will cease to operate (is turned off from an on position).

A restarting means restarts the electrical operation circuit of the folding operable wall after the identity of the individual trained and authorized to maintain the folding operable wall is verified, wherein the restarting means includes a reset control key switch in at least one control unit, which when turned on will reactivate the electrical operation circuit and biometric verification system 18.

To normally close an electrically operated folding operable wall of an electrically operated folding operable wall system that includes an extend control switch 14 and a stack control switch 16, rather than a key switch 22, in accordance with the methods of the present invention, the individual responsible for maintaining the electrically operated folding operable wall must create a new record using biometric verification system 18 in a test phase. In one embodiment, shown in FIG. 1, the individual responsible for maintaining the electrically operated folding operable wall is required to place his or her finger 20 (or an artificial reproduction thereof) on a fingerprint scanner included in biometric verification system 18 in the test phase, which creates a new record of the individual's fingerprint (or an image of the artificial reproduction of a fingerprint from an authorized individual whose fingerprint was recorded in the enrollment phase) and compares the same with fingerprint images in a database included in biometric verification system 18 obtained during an enrollment phase (templates). If the image of the fingerprint in the new record matches a template fingerprint image in the database, the identity of the individual from the enrollment phase is confirmed. Once the individual's identity is confirmed, the operator presses extend control switch 14. Pressing extend control switch 14 will electrically connect extend control switch 14 with control station 12, which will activate the proper control relays and motor. The electrically operated folding operable wall will then close along the operating path and extend to the distal side wall.

To normally open an electrically operated folding operable wall of an electrically operated folding operable wall system that includes an extend control switch 14 and a stack control switch 16, rather than a key switch 22, in accordance with the methods of the present invention, the individual responsible for maintaining the electrically operated folding operable wall must create a new record using biometric verification system 18. As shown in FIG. 1, the individual responsible for maintaining the electrically operated folding operable wall is required to place his or her finger 20 (or an artificial reproduction thereof) on a fingerprint scanner included in biometric verification system 18 to create a new record in a test phase, which captures an image of the individual's fingerprint (or an artificial reproduction thereof) and compares the image of the individual's fingerprint with the with fingerprint images in a database included in biometric verification system 18 obtained during an enrollment phase. If the image of the fingerprint matches in the new record matches a template fingerprint image in the database, the identity of the individual from the enrollment phase is confirmed. Once the individual's identity is confirmed, the individual responsible for maintaining the electrically operated folding operable wall presses stack control switch 16. After stack control switch 16 is pressed, stack control switch 16 will electrically connect through control station 12, which will activate the proper control relays and motor. The electrically operated folding operable wall will then open along the operating path and stack up to the stacked side wall.

If biometric verification system 18 is unable to verify the identity of the individual responsible for maintaining the electrically operated folding operable wall at any time in which the electrically operated folding operable wall is in operation, the preventing means will cause the electrically operated folding operable wall to stop. In particular, if biometric verification system 18 is unable to verify the identity of the individual responsible for maintaining the electrically operated folding operable wall, the preventing means will turn off control station 12, which in turn stops the motor. In order to continue opening or closing the electrically operated folding operable wall, the individual responsible for maintaining the electrically operated folding operable wall is required to follow the appropriate steps, as set forth above. In some embodiments, the individual responsible for maintaining the electrically operated folding operable wall must be in direct contact with control station 12 the entire time the electrically operated folding operable wall is being opened or closed. For example, in some embodiments, the individual must keep his or her finger on the fingerprint sensor while the wall is being opened or closed. That is, if the individual removes his or her finger from the fingerprint sensor, the preventing means will activate to prevent the wall from further opening or closing.

To normally close an electrically operated folding operable wall of an electrically operated folding operable wall system that includes a key switch, rather than an extend control switch 14 and a stack control switch 16, as shown in FIG. 4, in accordance with the methods of the present invention, the individual responsible for maintaining the electrically operated folding operable wall must create a new record using biometric verification system 18. For example, the individual responsible for maintaining the electrically operated folding operable wall may be required to place his or her finger 20 (or an artificial reproduction thereof) on a fingerprint scanner included in biometric verification system 18 in a test phase, as shown in FIG. 1, which captures an image of the individual's fingerprint and compares the image of the individual's fingerprint with the with fingerprint images in a database included in biometric verification system 18 obtained during an enrollment phase. If the image of the fingerprint in the new record matches a template fingerprint image in the database, the identity of the individual from the enrollment phase is confirmed. Once the individual's identity is confirmed, the operator turns key switch 22 to a first position 22a. After key switch 22 is turned to a first position 22a, key switch 22 will electrically connect through control station 12, which will activate the proper control relays and motor. The electrically operated folding operable wall will then close along the operating path and extend to the distal side wall.

In one particular embodiment of the present invention, in order to continue opening or closing the electrically operated folding operable wall after the preventing means has caused the electrically operated folding operable wall to stop, the individual responsible for maintaining the electrically operated folding operable wall is required to activate a reset control switch, before following the appropriate steps set forth above for opening and closing.

To normally open an electrically operated folding operable wall of an electrically operated folding operable wall system that includes a key switch, rather than an extend control switch 14 and a stack control switch 16, as shown in FIG. 4, the individual responsible for maintaining the electrically operated folding operable wall must create a new record using biometric verification system 18. For example, the individual responsible for maintaining the electrically operated folding operable wall may be required to place his or her finger 20 (or an artificial reproduction thereof) on a fingerprint scanner included in biometric verification system 18 in a test phase, as shown in FIG. 1, which captures an image of the individual's fingerprint and compares the image of the individual's fingerprint with the with fingerprint images in a database included in biometric verification system 18 obtained during an enrollment phase. If the image of the fingerprint in the new record matches a template fingerprint image in the database, the identity of the individual from the enrollment phase is confirmed. Once the individual's identity is confirmed, the operator turns key switch 22 to a second position 22b. After key switch 22 is turned to a second position 22b, key switch 22 will electrically connect through control station 12, which will activate the proper control relays and motor. The electrically operated folding operable wall will then open along the operating path and stack up to the stacked side wall. Switch 23 is a tamper resistant push button switch for actuation by the finger of a human operator for operation and control as described above in connection with extend control switch 14 and stack control switch 16.

If biometric verification system 18 is unable to verify the identity of the individual responsible for maintaining the electrically operated folding operable wall at any time in which the electrically operated folding operable wall is in operation, the preventing means will cause the electrically operated folding operable wall to stop. In particular, if biometric verification system 18 is unable to verify the identity of the individual responsible for maintaining the electrically operated folding operable wall, the preventing means will turn off control station 12, which in turn stops the motor. In order to continue opening or closing the electrically operated folding operable wall, the individual responsible for maintaining the electrically operated folding operable wall is required to follow the appropriate steps, as set forth above.

In one embodiment, shown in FIG. 2, control station 12 includes an interface having biometric verification system 18. Control station 12 may be coupled to an existing electrically operated folding operable wall system, such as, for example, an electrically operated folding operable wall system that lacks a biometric verification system to facilitate retrofitting of older equipment. Control station 12 permits operation of an extend control switch and a stack control switch of the existing electrically operated folding operable wall system when authentication of the operator is confirmed, and prevents operation of the extend control switch and the stack control switch when authentication of the operator is not confirmed. To normally close an electrically operated folding operable wall having such a system, the individual responsible for maintaining the electrically operated folding operable wall must create a new record using biometric verification system 18. For example, the individual responsible for maintaining the electrically operated folding operable wall may be required to place his or her finger 20 (or an artificial reproduction thereof) on a fingerprint scanner included in biometric verification system 18 in a test phase, as shown in FIG. 1, which captures an image of the individual's fingerprint and compares the image of the individual's fingerprint with the with fingerprint images in a database included in biometric verification system 18 obtained during an enrollment phase. If the image of the fingerprint in the new record matches a template fingerprint image in the database, the identity of the individual from the enrollment phase is confirmed. Once the individual's identity is confirmed, the individual responsible for maintaining the electrically operated folding operable wall either turns a key switch or presses an extend control switch. Turning the key switch or pressing the extend control switch will electrically connect the key switch or the extend control switch 14 through control station 12, which will activate the proper control relays and motor. The electrically operated folding operable wall will then close along the operating path and extend to the distal side wall.

To normally open an electrically operated folding operable wall having such a system, the individual responsible for maintaining the electrically operated folding operable wall must create a new record using biometric verification system 18. For example, the individual responsible for maintaining the electrically operated folding operable wall may be required to place his or her finger 20 (or an artificial reproduction thereof) on a fingerprint scanner included in biometric verification system 18 in a test phase, as shown in FIG. 1, which captures an image of the individual's fingerprint and compares the image of the individual's fingerprint with the with fingerprint images in a database included in biometric verification system 18 obtained during an enrollment phase. If the image of the fingerprint in the new record matches a template fingerprint image in the database, the identity of the individual from the enrollment phase is confirmed. Once the individual's identity is confirmed, the operator either turns a key switch or presses a stack control switch. Turning the key switch or pressing the stack control switch will electrically connect the key switch or the stack control switch through control station 12, which will activate the proper control relays and motor. The electrically operated folding operable wall will then open along the operating path and stack up to the stacked side wall.

Figure 5:
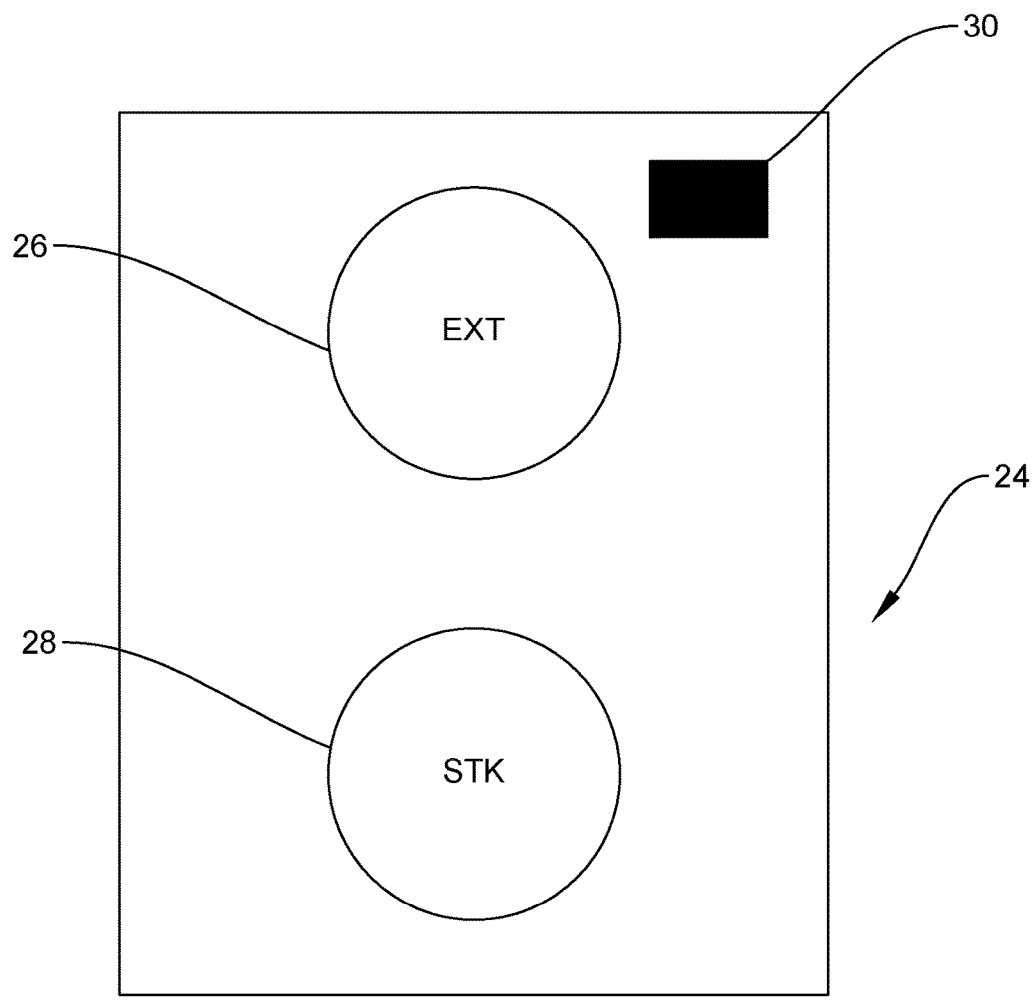
FIG. 5 is a side view of the control station of one embodiment of the electrically operated folding partition system in accordance with the principles of the present disclosure.

In some embodiments, the control station 12 shown in FIG. 2 may be coupled to a control station, such as, for example, a control station 24, shown in FIG. 5, that lacks a biometric verification system. Control station 24 includes an extend control switch 26 similar to extend control switch 14 and a stack control switch 28 similar to stack control switch 16. Control switch 26 and stack control switch 28 are configured to open and close the electrically operated folding operable wall, similar to extend control switch 14 and stack control switch 16.

In some embodiments, the control station 12 shown in FIG. 2 may be directly wired to control station 24. In such embodiments, the control station 12 will send a signal to control station 24 via a wired connection when authorization of the operator is confirmed to allow extend control switch 26 and/or stack control switch 28 to be actuated to open and close the electrically operated folding operable wall, as discussed herein. In such embodiments, control station 12 will not send the signal to control station 24 unless and until authorization of the operator is confirmed, which prevents control switch 26 and/or stack control switch 28 from being actuated to open and close the electrically operated folding operable wall unless and until authorization of the operator is confirmed.

In some embodiments, the control station 12 shown in FIG. 2 may wirelessly couple to control station 24. For example, in some embodiments, the control station 12 shown in FIG. 2 may include a sensor 12a configured to send a signal to a sensor 30 of control station 24 when authorization of the operator is confirmed to allow extend control switch 26 and/or stack control switch 28 to be actuated to open and close the electrically operated folding operable wall, as discussed herein. In such embodiments, sensor 12a will not send the signal to sensor 30 of control station 24 unless and until authorization of the operator is confirmed, which prevents control switch 26 and/or stack control switch 28 from being actuated to open and close the electrically operated folding operable wall unless and until authorization of the operator is confirmed.

Figure 6:
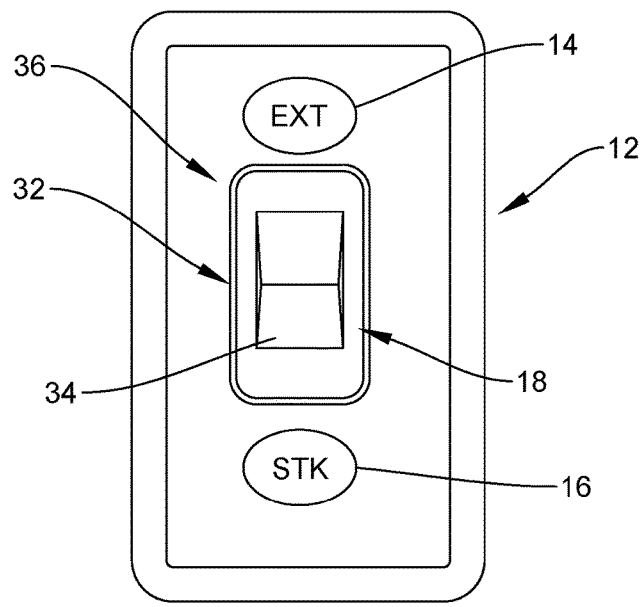
FIG. 6 is a side view of the control station of one embodiment of the electrically operated folding partition system in accordance with the principles of the present disclosure.

In one embodiment, shown in FIG. 6, biometric verification system 18 of control station 12 includes a fingerprint scanner 32 incorporated directly into control station 12. Fingerprint scanner 32 includes a tray 34 that is accessible by rotating a flap 36 relative to a face of control station 12. To operate the electrically operated folding operable wall, a user rotates flap 36 relative to the face of control station 12 to move flap 36 from a closed orientation in which tray 34 is not accessible to an open configuration in which tray 34 is accessible. The user then presses one or more of his or her fingers, such as, for example, finger 20 against tray 34. Pressing one or more of the user's fingers against tray 34 causes fingerprint scanner 32 to scan the user's finger(s) that is/are pressed against tray 34 to create one or more fingerprint images and create a new record of the one or more fingerprint images. Fingerprint scanner 32 and/or biometric verification system 18 will then compare the fingerprint images obtained by fingerprint scanner 32 (the new record) with fingerprint images in a database in biometric verification system 18 that were obtained during an enrollment phase (templates). If the image(s) of the fingerprint(s) in the new record match a template fingerprint image in the database, the identity of the individual from the enrollment phase is confirmed. Once the individual's identity is confirmed, the operator may press extend control switch 14 and/or stack control switch 16 to open or close the electrically operated folding operable wall. If the image(s) of the fingerprint(s) in the new record do not match a template fingerprint image in the database, the identity of the individual from the enrollment phase is not confirmed and control station 12 will prevent the operator from pressing extend control switch 14 and/or stack control switch 16. That is, extend control switch 14 and/or stack control switch 16 will be non-operational unless and until the individual's identity is confirmed.

Figure 7:
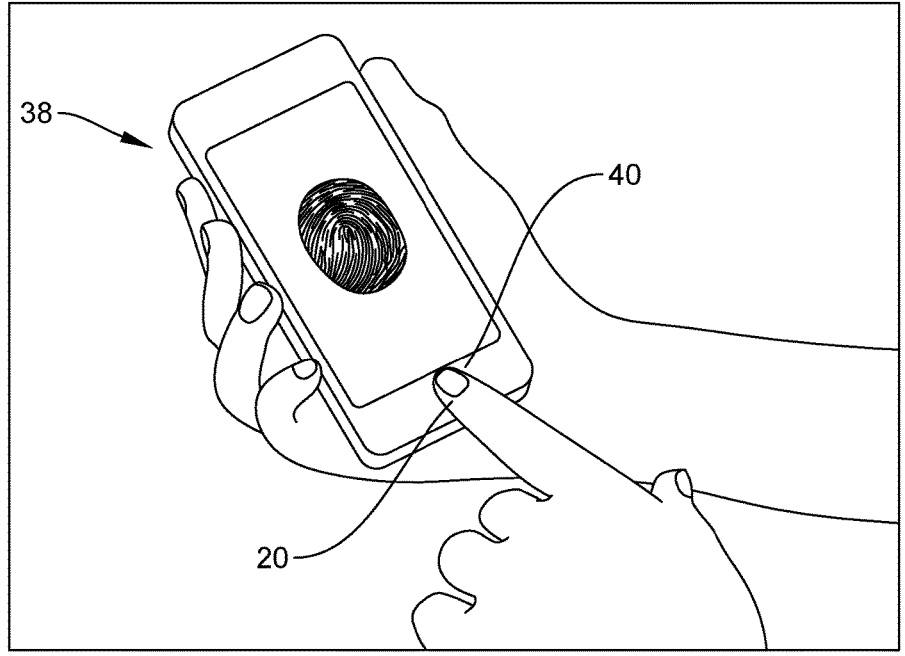
FIG. 7 is a perspective view of a device compatible with the control station of one embodiment of the electrically operated folding partition system in accordance with the principles of the present disclosure.

In one embodiment, shown in FIG. 7, the system of the present disclosure uses a handheld device, such as, for example, a tablet or smartphone 38 that includes a fingerprint scanner 40. In some embodiments, smartphone 38 includes an application and/or software that is compatible with fingerprint scanner 40. Smartphone 38 further includes a sensor that is configured to send a signal to a sensor, such as, for example, sensor 30 of the control station 12 shown in FIG. 5. In some embodiments, smartphone 38 is configured to display an image of a fingerprint obtained by fingerprint scanner 40 on a screen of smartphone 38, as shown in FIG. 7. Pressing one or more of the user's fingers against fingerprint scanner 40 causes fingerprint scanner 40 to scan the user's finger(s) that is/are pressed against fingerprint scanner 40 to create one or more fingerprint images and create a new record of the one or more fingerprint images. Smartphone 38 includes a processor that compares the new record with fingerprint images in a database that were obtained during an enrollment phase (templates). If the image(s) of the fingerprint(s) in the new record match a template fingerprint image in the database, the identity of the individual from the enrollment phase is confirmed. Once the individual's identity is confirmed, the sensor of smartphone 38 will send a signal to sensor 30 to allow the operator to press extend control switch 14 and/or stack control switch 16 to open or close the electrically operated folding operable wall. However, if the individual's identity is not confirmed, the sensor of smartphone 38 will not send a signal to sensor 30 to allow the operator to press extend control switch 14 and/or stack control switch 16. That is, extend control switch 14 and/or stack control switch 16 will be non-operational unless and until the individual's identity is confirmed and the sensor of smartphone 38 sends a signal to sensor 30.

Figure 8:
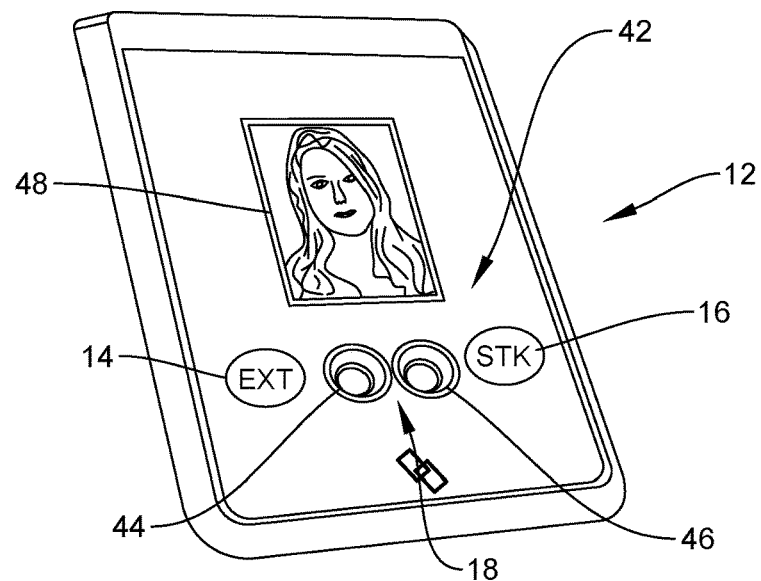
FIG. 8 is a perspective view of the control station of one embodiment of the electrically operated folding partition system in accordance with the principles of the present disclosure.

In one embodiment, shown in FIG. 8, biometric verification system 18 of control station 12 includes a face scanner 42 incorporated directly into control station 12. Face scanner 42 includes a first camera 44. In some embodiments, face scanner 42 also includes a second camera 46. Camera 44 and/or camera 46 are configured to take an image of a person's face and display the image of the person's face on a display 48. Face scanner 42 includes a processor configured to compare the image of the person's face taken by camera 44 and/or camera 46 with facial images in a database. To operate the electrically operated folding operable wall, a user positions his or her face in front of camera 44 and/or camera 46, which capture an image of the user's face to create one or more facial images and create a new record of the one or more facial images. Face scanner 42 and/or biometric verification system 18 will then compare the facial images obtained by face scanner 42 (the new record) with facial images in a database in biometric verification system 18 that were obtained during an enrollment phase (templates). If the image(s) of the face in the new record match a template facial image in the database, the identity of the individual from the enrollment phase is confirmed. Once the individual's identity is confirmed, the operator may press extend control switch 14 and/or stack control switch 16 to open or close the electrically operated folding operable wall. If the image(s) of the face in the new record do not match a template facial image in the database, the identity of the individual from the enrollment phase is not confirmed and control station 12 will prevent the operator from pressing extend control switch 14 and/or stack control switch 16. That is, extend control switch 14 and/or stack control switch 16 will be non-operational unless and until the individual's identity is confirmed.

Figure 9:
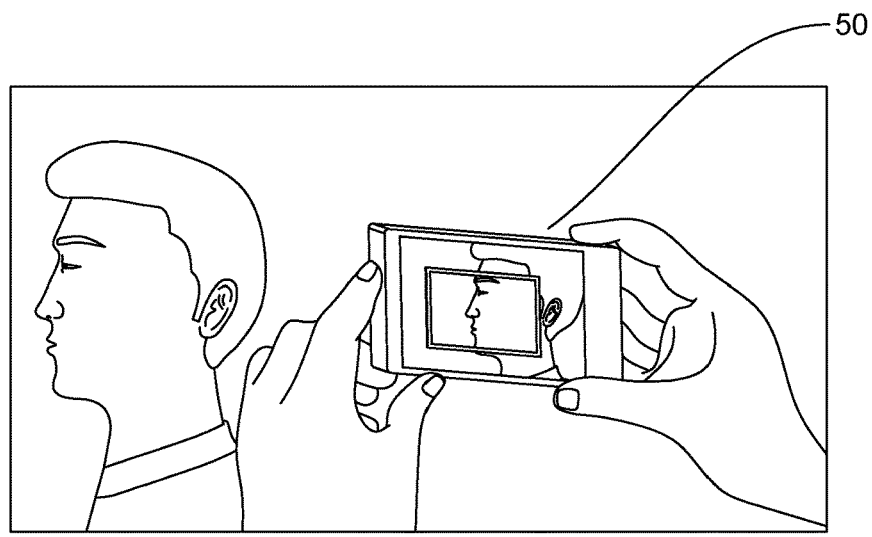
FIG. 9 is a perspective view of a device compatible with the control station of one embodiment of the electrically operated folding partition system in accordance with the principles of the present disclosure.

In one embodiment, shown in FIG. 9, the system of the present disclosure uses a handheld device, such as, for example, a tablet or smartphone 50 that includes a camera and a processor configured to create facial images taken by the camera. Smartphone 50 further includes a sensor that is configured to send a signal to a sensor, such as, for example, sensor 30 of the control station 12 shown in FIG. 5. In some embodiments, smartphone 50 is configured to display a facial image obtained by the camera on a screen of smartphone 50, as shown in FIG. 9. The camera captures one or more facial images and the processor of smartphone 50 creates a new record of the one or more facial images. The processor of smartphone 50 compares the new record with facial images in a database that were obtained during an enrollment phase (templates). If the facial image(s) in the new record match a template facial image in the database, the identity of the individual from the enrollment phase is confirmed. Once the individual's identity is confirmed, the sensor of smartphone 50 will send a signal to sensor 30 to allow the operator to press extend control switch 14 and/or stack control switch 16 to open or close the electrically operated folding operable wall. However, if the individual's identity is not confirmed, the sensor of smartphone 50 will not send a signal to sensor 30 to allow the operator to press extend control switch 14 and/or stack control switch 16. That is, extend control switch 14 and/or stack control switch 16 will be non-operational unless and until the individual's identity is confirmed and the sensor of smartphone 50 sends a signal to sensor 30.

Figure 10:
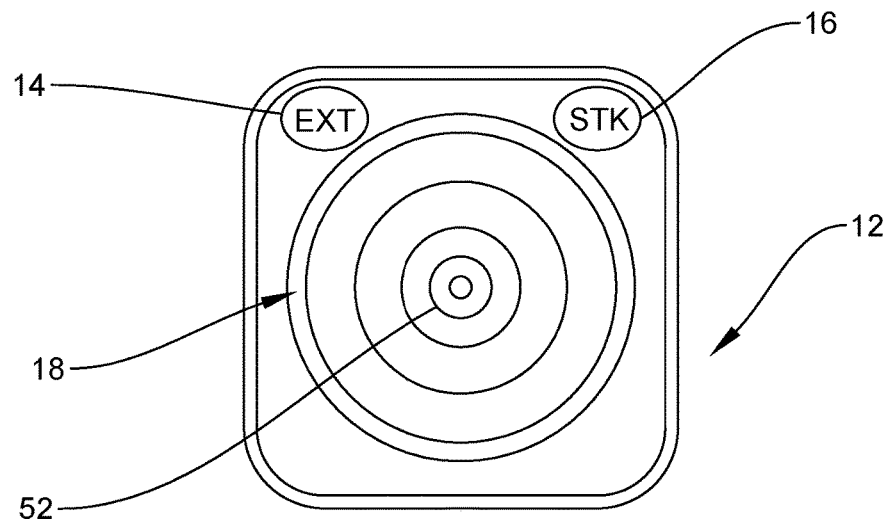
FIG. 10 is a side view of the control station of one embodiment of the electrically operated folding partition system in accordance with the principles of the present disclosure.

In one embodiment, shown in FIG. 10, biometric verification system 18 of control station 12 includes a retina scanner 52 incorporated directly into control station 12. Retina scanner 52 includes a camera configured to take an image of a person's retina. Retina scanner 52 includes a processor configured to compare the image of the person's retina taken by the camera with images of retinas in a database. To operate the electrically operated folding operable wall, a user positions his or her face in front of the camera, which captures an image of the user's retina to create one or more retina images and create a new record of the one or more retina images. Retina scanner 52 and/or biometric verification system 18 will then compare the retina images obtained by the camera (the new record) with retina images in a database in biometric verification system 18 that were obtained during an enrollment phase (templates). If the image(s) of the retina in the new record match a template retina image in the database, the identity of the individual from the enrollment phase is confirmed. Once the individual's identity is confirmed, the operator may press extend control switch 14 and/or stack control switch 16 to open or close the electrically operated folding operable wall. If the image(s) of the retina in the new record do not match a template retina image in the database, the identity of the individual from the enrollment phase is not confirmed and control station 12 will prevent the operator from pressing extend control switch 14 and/or stack control switch 16. That is, extend control switch 14 and/or stack control switch 16 will be non-operational unless and until the individual's identity is confirmed.

Figure 11:
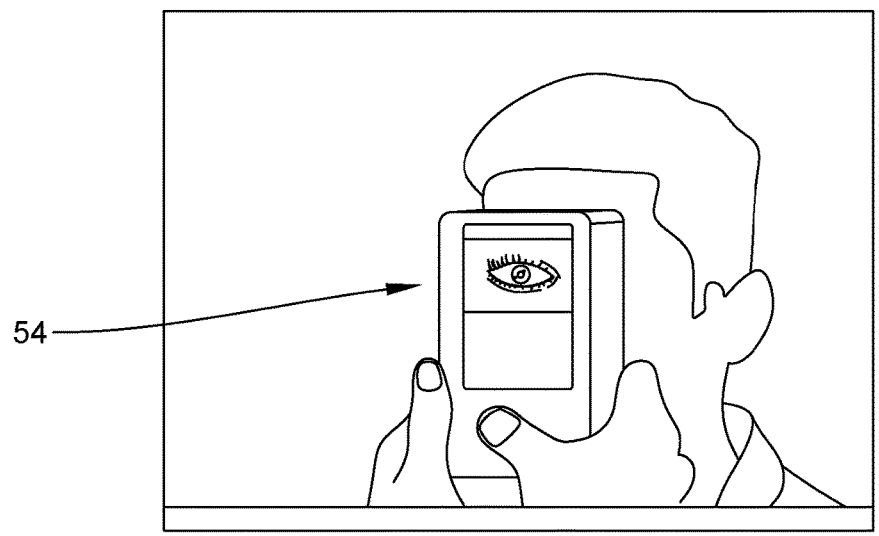
FIG. 11 is a perspective view of a device compatible with the control station of one embodiment of the electrically operated folding partition system in accordance with the principles of the present disclosure.

In one embodiment, shown in FIG. 11, the system of the present disclosure uses a handheld device, such as, for example, a tablet or smartphone 54 that includes a camera and a processor configured to create one or more retina images taken by the camera. Smartphone 54 further includes a sensor that is configured to send a signal to a sensor, such as, for example, sensor 30 of the control station 12 shown in FIG. 5. In some embodiments, smartphone 54 is configured to display a retina image obtained by the camera on a screen of smartphone 54, as shown in FIG. 11. The camera captures one or more retina images and the processor of smartphone 54 creates a new record of the one or more retina images. The processor of smartphone 54 compares the new record with retina images in a database that were obtained during an enrollment phase (templates). If the retina image(s) in the new record match a template retina image in the database, the identity of the individual from the enrollment phase is confirmed. Once the individual's identity is confirmed, the sensor of smartphone 54 will send a signal to sensor 30 to allow the operator to press extend control switch 14 and/or stack control switch 16 to open or close the electrically operated folding operable wall. However, if the individual's identity is not confirmed, the sensor of smartphone 54 will not send a signal to sensor 30 to allow the operator to press extend control switch 14 and/or stack control switch 16. That is, extend control switch 14 and/or stack control switch 16 will be non-operational unless and until the individual's identity is confirmed and the sensor of smartphone 54 sends a signal to sensor 30.

Figure 12:
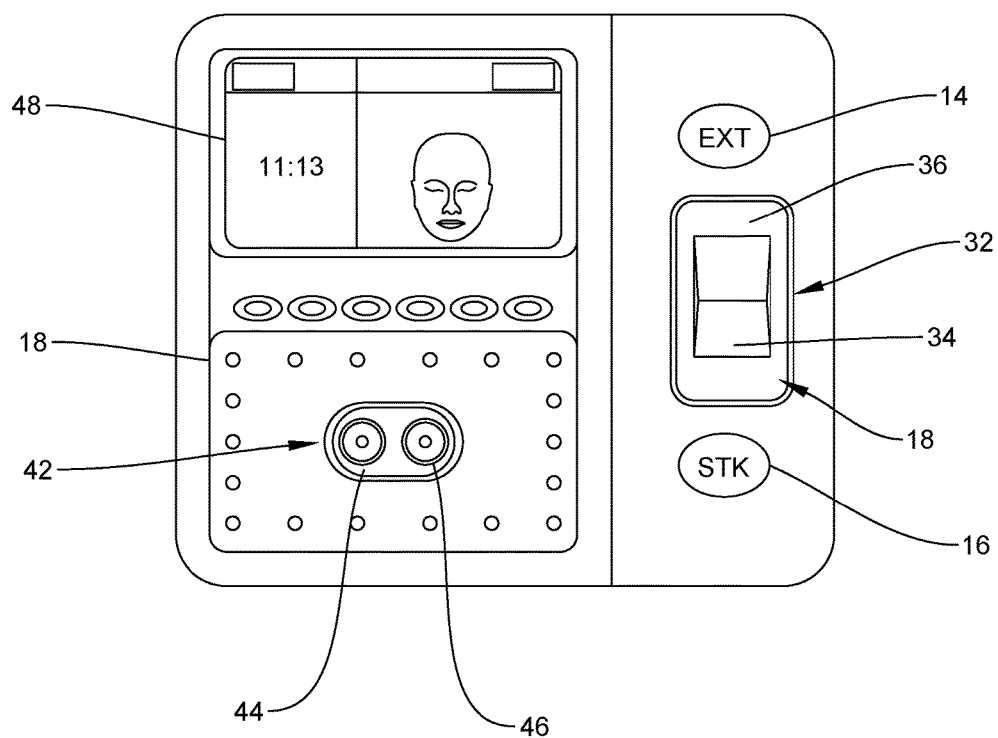
FIG. 12 is a side view of the control station of one embodiment of the electrically operated folding partition system in accordance with the principles of the present disclosure.

In one embodiment, shown in FIG. 12, biometric verification system 18 of control station 12 includes a two or more scanners/systems incorporated directly into control station 12. As shown in FIG. 12, control station 12 includes a fingerprint scanner 32 and a facial scanner 42 incorporated directly into control station 12. However, it is envisioned that control station 12 may include two or more of any of the scanners/systems discussed herein. For example, control station 12 may include a fingerprint scanner, such as, for example, fingerprint scanner 32, a facial scanner, such as, for example, facial scanner 42, a retina scanner, such as, for example, retina scanner 52, an earlobe geometry recognition system, a hand geometry recognition system, an iris recognition system, a voice recognition system, a signature recognition system and/or a key stroke recognition system. In some embodiments, an individual's identity must be confirmed using at least two scanners/systems before the individual can open or close the electrically operated folding operable wall. For example, fingerprint scanner 32 and/or biometric verification system 18 will compare fingerprint images obtained by fingerprint scanner 32 (the new record) with fingerprint images in a database in biometric verification system 18 that were obtained during an enrollment phase (templates). If the image(s) of the fingerprint(s) in the new record match a template fingerprint image in the database, face scanner 42 and/or biometric verification system 18 will then compare the facial images obtained by face scanner 42 (the new record) with facial images in a database in biometric verification system 18 that were obtained during an enrollment phase (templates). If the image(s) of the face in the new record match a template facial image in the database, the identity of the individual from the enrollment phase is confirmed. Once the individual's identity is confirmed, the operator may press extend control switch 14 and/or stack control switch 16 to open or close the electrically operated folding operable wall. If the image(s) of the face in the new record do not match a template facial image in the database, the identity of the individual from the enrollment phase is not confirmed and control station 12 will prevent the operator from pressing extend control switch 14 and/or stack control switch 16. That is, extend control switch 14 and/or stack control switch 16 will be non-operational unless and until the individual's identity is confirmed. It is envisioned that the order of the verification systems can be reversed. For example, the identity of the individual may be confirmed by face scanner 42 before the individual's identity is confirmed by fingerprint scanner 32.

Figure 13:
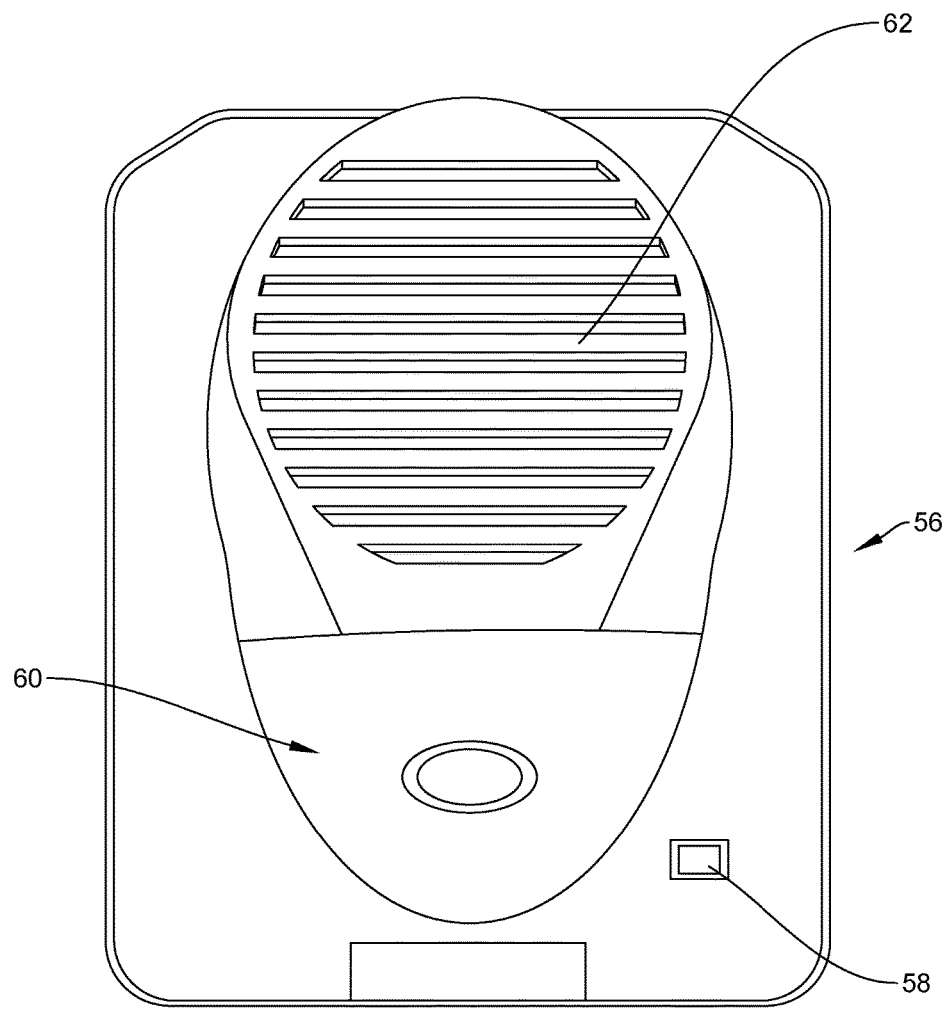
FIG. 13 is a perspective view of a device compatible with the control station of one embodiment of the electrically operated folding partition system in accordance with the principles of the present disclosure.

In one embodiment, shown in FIG. 13, the control stations 12 discussed above may wirelessly couple to an alarm, such as, for example, a horn strobe 56 configured to notify persons in the same room and/or area as the electrically operated folding operable wall that the electrically operated folding operable wall is being opened and/or closed. For example, in some embodiments, the control stations 12 discussed above may include a sensor, such as, for example, sensor 12a configured to send a signal to a sensor 58 of horn strobe 56 when authorization of the operator is confirmed to allow extend control switch 26 and/or stack control switch 28 to be actuated to open and close the electrically operated folding operable wall, as discussed herein. In such embodiments, sensor 12a will not send the signal to sensor 58 unless and until authorization of the operator is confirmed, which prevents control switch 26 and/or stack control switch 28 from being actuated to open and close the electrically operated folding operable wall unless and until authorization of the operator is confirmed. In some embodiments, when authorization of the operator is confirmed, sensor 12a will send the signal to sensor 58 and a strobe 60 of horn strobe 56 will provide flashes of light intermittently and/or a speaker 62 of horn strobe 56 will produce a loud sound to notify persons in the same room and/or area as the electrically operated folding operable wall that the electrically operated folding operable wall is being opened and/or closed.

In some embodiments, strobe 60 will provide flashes of light intermittently and/or a speaker 62 will produce a loud sound before the electrically operated folding operable wall begins to open or close. For example, strobe 60 can provide flashes of light intermittently and/or a speaker 62 can produce a loud sound for a selected amount of time, such as, for example, one or more minutes before the electrically operated folding operable wall begins to open or close. This will provide people in a path of the electrically operated folding operable wall to exit the path of the electrically operated folding operable wall before the electrically operated folding operable wall begins to open or close. In some embodiments, strobe 60 will provide flashes of light intermittently and/or a speaker 62 will produce a loud sound until the electrically operated folding operable wall is fully opened or closed and strobe 60 and/or speaker 62 will cease to provide intermittent flashes of light and/or a loud noise once the electrically operated folding operable wall is fully opened or closed. In some embodiments, strobe 60 will continue to provide flashes of light intermittently and/or a speaker 62 will continue to produce a loud sound for a period of time, such as, for example, one or more minutes after the electrically operated folding operable wall is fully opened or closed.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method for maintaining a folding operable wall comprising:
   (a) providing an electrically operated folding operable wall controlled by an electrical operation circuit and having at least one biometric verification system;
   (b) recording a template of a biological trait of an authorized individual into the biometric verification system;
   (c) saving the template in a database associated with the biometric verification system;
   (d) capturing a new record of a biological trait of a person desiring to maintain the folding operable wall;
   (e) comparing the new record against the template;
   (f) authenticating the identity of the person desiring to maintain the folding operable wall if the new record is substantially similar to the saved template; and
   (g) preventing the wall from moving if the biometric verification system fails to continuously authenticate the identity of the person desiring to maintain the folding operable wall.

2. The method of claim 1, wherein the folding operable wall includes at least one control station and the biometric verification system is operative coupled to the at least one control station.

3. The method of claim 1, wherein the biometric verification system is operatively coupled to first and second control stations, the electrical operation circuit including a preventing means configured to prevent the wall from moving if the identity of the individual desiring to maintain the folding operable wall is not continuously authenticated at the first control station or the second control station.

4. The method of claim 1, wherein step (e) of comparing the new record against the template employs the use of an algorithm.

5. The method of claim 1, wherein the electrical operation circuit comprises a restarting means which includes a reset control key configured to reactivate the electrical operation circuit and the biometric verification system.

6. The method of claim 1, wherein the electrical operation circuit comprises an extend control switch, a stack control switch, control relays and a motor.

7. The method of claim 1, wherein the new record is captured from an artificial reproduction of the designated biological trait recorded in the template of the at least one biological trait of the individual trained and authorized to maintain the folding operable wall.

8. The method of claim 1, wherein the biometric verification system is selected from the group consisting of: fingerprint recognition systems, facial recognition systems, earlobe geometry recognition systems, hand geometry recognition systems, iris recognition systems, retina recognition systems, voice recognition systems, signature recognition systems, key stroke recognition systems, and combinations thereof.

9. The method of claim 1, wherein the biometric verification system comprises a fingerprint recognition system and includes a fingerprint scanner selected from the group consisting of optical sensors, ultrasonic sensors and capacitance sensors.

10. The method of claim 9, wherein step (e) of comparing the new record against the template employs the use of a pattern-based algorithm which graphically compares images of the fingerprint.

11. The method of claim 1, wherein the biometric verification system comprises a facial recognition system and the saved template comprises a digital image or a video frame from a video source.

12. The method of claim 11, wherein step (e) of comparing the new record against the template employs the use of an algorithm which analyzes the relative position, size or shape of one or more of a person's eyes, nose, cheekbone, mouth and jaw.

13. The method of claim 11, wherein the facial recognition system includes one or more 3-D sensors for capturing information about the shape of a person's face.

14. The method of claim 1, wherein the biometric verification system comprises an iris recognition system.

15. The method of claim 1, wherein the biometric verification system comprises a hand geometry recognition system.

16. The method of claim 1, wherein the biometric verification system comprises an ear lobe geometry recognition system.

17. The method of claim 1, wherein the biometric verification system comprises a speaker recognition system.

18. The method of claim 1, wherein a preventing means is configured to prevent the wall from moving if the identity of the individual desiring to maintain the folding operable wall is not continuously authenticated.

19. A method for maintaining a folding operable wall comprising:
 a) providing an electrically operated folding operable wall controlled by an electrical operation circuit of the type having at least one control station, an extend control switch, a stack control switch, control relays and a motor;
 b) recording a template of at least one designated biological trait of an individual trained and authorized to maintain the folding operable wall into a biometric verification system coupled to the at least one control station;
 c) saving the template of the at least one designated biological trait of an individual trained and authorized to maintain the folding operable wall in a database within the biometric verification system;
 d) capturing from an individual desiring to maintain the folding operable wall a new record of the designated biological trait;
 e) comparing the new record against the saved template using an algorithm;
 f) authenticating the identity of the individual desiring to maintain the folding operable wall if the new record is substantially similar to the saved template; and
 g) preventing the wall from moving if the biometric verification system fails to continuously authenticate the identity of the individual desiring to maintain the folding operable wall, wherein the electrical operation circuit includes a preventing means configured to prevent the wall from moving if the identity of the individual desiring to maintain the folding operable wall is not continuously authenticated.

20. A method for maintaining a folding operable wall comprising:
 (a) providing an electrically operated folding operable wall controlled by a first control unit having a first biometric verification system and a second control unit having a second biometric verification system;
 (b) recording a template of a biological trait of an authorized individual into the biometric verification systems;
 (c) saving the template in a database associated with the biometric verification systems;
 (d) capturing a new record of a biological trait of a person desiring to maintain the folding operable wall;
 (e) comparing the new record against the template;
 (f) authenticating the identity of the person desiring to maintain the folding operable wall if the new record is substantially similar to the saved template; and
 (g) preventing the wall from moving if the biometric verification systems fail to continuously authenticate the identity of the person desiring to maintain the folding operable wall.

* * * * *